US007529162B2

(12) United States Patent
Muzio et al.

(10) Patent No.: US 7,529,162 B2
(45) Date of Patent: May 5, 2009

(54) WOBBLE DEMODULATION FOR HIGH DENSITY OPTICAL RECORDING MEDIA

(76) Inventors: Pierluigi Lo Muzio, Pforzheimer Str. 37, D-78048 Villingen-Schwenningen (DE); Marco Georgi, Hunaeusstr. 7, D-30177 Hannover (DE)

( * ) Notice: Subject to any disclaimer, the term of this patent is extended or adjusted under 35 U.S.C. 154(b) by 1007 days.

(21) Appl. No.: 10/853,679

(22) Filed: May 25, 2004

(65) Prior Publication Data

US 2004/0252602 A1 Dec. 16, 2004

(30) Foreign Application Priority Data

Jun. 16, 2003 (EP) ................................ 03013620

(51) Int. Cl.
*G11B 7/00* (2006.01)

(52) U.S. Cl. .................................. 369/47.1; 369/47.27

(58) Field of Classification Search ................ 369/47.1, 369/47.27, 47.28, 44.13, 275.3, 47.19
See application file for complete search history.

(56) References Cited

U.S. PATENT DOCUMENTS

| | | | | |
|---|---|---|---|---|
| 7,065,015 | B2 * | 6/2006 | Lee et al. | 369/47.1 |
| 2003/0099180 | A1 | 5/2003 | Park et al. | 369/59.25 |

FOREIGN PATENT DOCUMENTS

| | | |
|---|---|---|
| WO | 02/073607 | 9/2002 |
| WO | 03/005350 | 1/2003 |
| WO | 03/034413 | 4/2003 |
| WO | 03/034414 | 4/2003 |

OTHER PUBLICATIONS

Jung-Bae Park et al., "A new address decoder using digital msk demodulation technique for the HD-DVD system," 2002 International Symposium on Optical Memory and Optical Data Storage, Jul. 7-11, 2002, pp. 114-116, XP010600145.

* cited by examiner

*Primary Examiner*—Nabil Hindi
(74) *Attorney, Agent, or Firm*—Joseph J. Laks; Robert B. Levy

(57) ABSTRACT

The present invention relates to a method for the demodulation of the ADIP data of a wobble signal of an optical recording medium, whereby the wobble signal is modulated using two different methods, and to an apparatus for reading from and/or writing to optical recording media using such method.

According to the invention, the method comprises the steps of
- recovering the carrier of the wobble signal,
- demodulating the wobble signal based on the recovered carrier, and
- providing a two-dimensional MSK filter for detecting MSK marks in the wobble signal.

9 Claims, 3 Drawing Sheets

WOBBLE DEMODULATION FOR HIGH DENSITY OPTICAL RECORDING MEDIA

This application claims the benefit under 35 U.S.C. §119 of European application No. 03013620.4, filed Jun. 16, 2003.

FIELD OF THE INVENTION

The present invention relates to a method for the demodulation of the ADIP data of a wobble signal of an optical recording medium, and to an apparatus for reading from and/or writing to optical recording media using such method.

BACKGROUND OF THE INVENTION

Methods such as these are used, for example, in an apparatus for reading from and/or writing to optical recording media having wobbled tracks, in order to obtain address information from the wobbled tracks (ADIP information, address in pregroove) or to use the wobble frequency to produce a write clock.

In general, in optical recording media, which are in the form of discs and are suitable for reading from and/or writing to, the tracks are formed such that they represent an interleaved spiral or concentric circles. Especially in the case of optical recording media which are suitable for writing to, the tracks additionally are wobbled in a specific form, in order to find specific positions on the medium. This means that the track is not an approximately straight line, but a serpentine line. By way of example, the shape of this serpentine line can contain address information, which is used for identifying a specific position on this optical recording medium. Various methods are used for coding, examples of which include frequency modulation or phase modulation. Furthermore, the wobble signal may also be used for rotation speed information or for presetting a write data rate.

For high density optical recording media, it has been proposed to modulate the wobble signal using two methods in an intermixed manner: Minimum Shift Keying cosine variant (MSK-cos) and Harmonic Modulated Wave (HMW). Only some of the wobble periods are modulated. Most of the wobble periods are monotone wobbles (MW). The MSK-cos method is mainly adopted for the ADIP unit synchronization, replacing three wobble periods by one MSK mark. This is illustrated in FIG. 1. The MSK mark indicates the start of the ADIP unit or is used for synchronisation or data recognition. The HMW method is mainly employed for the ADIP data. The second harmonic of the fundamental wobble frequency is added to the wobble with a lower amplitude level. Its phase is in quadrature with the fundamental wobble frequency and it is bi-phase modulated according to the ADIP bit, which is illustrated in FIG. 2.

The two methods are not used separately for synchronization and ADIP information, as illustrated in the FIG. 3, which shows the different units ocurring in an ADIP word. On the one hand, in the ADIP word another MSK mark is added at different locations, for the data_0 unit at the wobble periods 14,15, and 16, and for the data_1 unit at the wobble periods 12,13, and 14. Therefore, MSK marks could be used also for ADIP data demodulation. On the other hand, some ADIP units, the so-called reference units, also have the second harmonic wobble frequency. In this case, the second harmonic has a fixed phase shift, so the reference unit could be used for the synchronization of the ADIP nibble.

Since the above described modulation of the wobble signal is quite new, solutions for a reliable wobble demodulation are hardly known. Typical schemes known from prior art for frequency or phase demodulation could be used, but it is difficult to apply the proper combination of both schemes. If only pure frequency demodulation or pure phase demodulation are used, a significant part of the signal energy is lost. This results in an undesirable performance degradation.

Kobayashi et al. in Jpn. J. Appl. Phys Vol. 42 (2003), pp 915-918, propose a method for detecting the MSK marks and the HMW sawtooth wobble. A heterodyne circuit consisting of a carrier multiplier, an integrator and a sample-and hold element is used for this purpose. The wobble signal is multiplied by the cosine carrier of the fundamental frequency for detecting the MSK marks in the multiplier. On the other hand it is multiplied by the sine carrier of the second harmonic frequency for detecting the HMW sawtooth wobble. However, the proposed method does only use a fraction of the available signal energy.

It is, therefore, an object of the invention to propose a method for a reliable wobble demodulation, which overcomes the above mentioned problems.

SUMMARY OF THE INVENTION

According to the invention a method for the demodulation of the ADIP data of a wobble signal of an optical recording medium, whereby the wobble signal is modulated using two different methods, comprises the steps of recovering the carrier frequency of the wobble signal, demodulating the wobble signal based on the recovered carrier frequency, and providing a two-dimensional MSK filter for detecting MSK marks in the wobble signal.

The carrier frequency is favourably recovered by means of a PLL. The phase can then be used for the coherent demodulation of the ADIP data. This gives an improvement of about 3 dB in comparison with incoherent demodulation schemes, which are based on frequency detection. A two-dimensional MSK filter has a better performance than other known detectors, e.g. a bi-phase detector limited to the fundamental frequency of the wobble. As a further refinement the step of demodulating the wobble signal based on the recovered carrier comprises down-converting the modulated data to the base band, i.e. a frequency related to the carrier frequency, and demodulating the down-converted data.

Advantageously, the method is applied to a wobble signal which is modulated using the methods of minimum shift keying (MSK) and harmonic modulated wave (HMW). Since such a wobble modulation has been proposed for high density optical recording media, a method capable of demodulating this type of wobble signal will become important.

Favourably, a combination of MSK demodulation and HMW demodulation is used for demodulating the down-converted data, the combination being based on the locations of the MSK marks. For the minimization of the error rate it is worth to use as much energy of the signal as possible for the detection of ADIP data bits. The detection can either use the location of the MSK mark or the phase of the second harmonic. The best result, however, is achieved by using both demodulations. For this purpose, the sampled output of an MSK filter detector and the sampled output of an HMW accumulator are properly mixed.

According to another aspect of the invention the step of down-converting the modulated data to the base band comprises using three distinct correlation paths. Two correlation paths are used for generating signals necessary for the detection of MSK marks. The third correlation path generates a signal which allows to detect a modulation in accordance with the HMW method.

Preferably the three distinct correlation paths correlate to the in-phase carrier, the second harmonic of the carrier, and the 1.5 frequency of the carrier, respectively. These are the frequencies which are necessary in order to detect wobbles modulated in accordance with the proposed MSK and the HMW methods. Of course, depending on the specific modulation, other frequencies are also suitable.

Advantageously, at least two of the correlation paths share components. This leads to a reduction of the implementation cost (in terms of silicon area). Possible shared components are sin/cos generators, multipliers and integrate & dumps.

Favourably, a device for demodulating the ADIP data of a wobble signal of an optical recording medium, whereby the wobble signal is modulated using two different methods, performs a method according to the invention.

Advantageously, a method according to the invention is performed by an apparatus for reading from and/or writing to optical recording media for wobble demodulation. Such an apparatus has an increased performance compared with an apparatus using only pure frequency demodulation or pure phase demodulation, since hardly any signal energy is lost.

BRIEF DESCRIPTION OF THE DRAWINGS

For a better understanding of the invention, an exemplary embodiment is specified in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERED EMBODIMENTS

Figure 4:
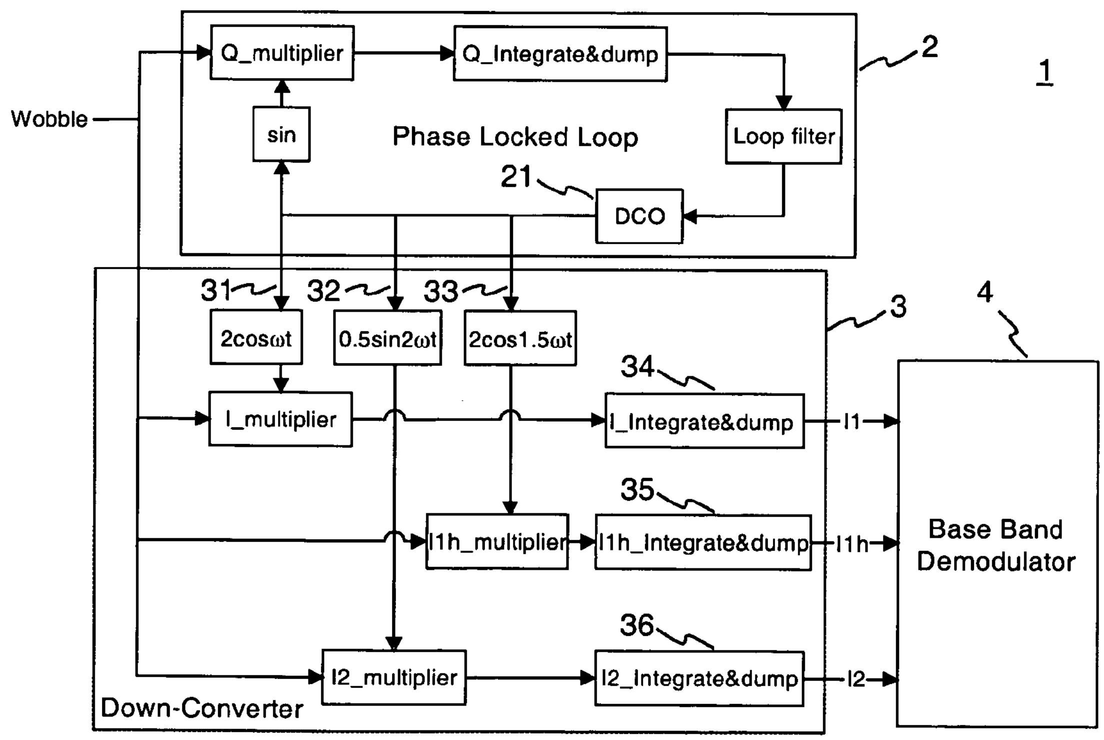
FIG. 4 schematically shows a coherent demodulator according to the present invention.

In FIG. 4 a coherent demodulator 1 according to the invention is shown. For the design of the demodulator 1 it is worth to consider that:

a) The MSK mark only takes a small part of the time multiplex. For the given example a maximum of nine wobble periods over the total 56 wobble periods of the ADIP unit is taken by the MSK marks.

b) The HMW modulation does not change the phase of the fundamental frequency of the wobble and allocates only a small part of the energy to the second harmonic frequency.

Therefore, it is possible to recover the phase of the fundamental carrier and to use it for the coherent demodulation of the ADIP data. This gives an improvement of 3 dB in comparison with incoherent demodulation schemes based on frequency detection. The carrier is favourably recovered by means of a PLL 2 and its phase used for the demodulation.

Of course, the problem of interference of the data modulation into the PLL loop 2 limits the performances of the coherent demodulator. However, this limitation is not severe. Moreover, this problem can be overcome by means of proper narrow-band filtering in the PLL loop or other feasible expedients.

The block diagram in FIG. 4 represents the demodulator 1, which includes the PLL 2, a down-converter 3 and a base band demodulator 4. The down-converter 3 converts the modulated data to the base-band. It includes three sub-paths 31, 32, 33. Each one is a correlator over the wobble periods. The first sub-path 31 correlates the in-phase carrier, the second one 32 correlates the second harmonic frequency and the third one 33 correlates the 1.5 frequency of the MSK mark. In the figure, the expression ωt represents $2\pi f_{wob}t$.

Considering a digital implementation, a digital controlled oscillator (DCO) 21 is used instead of a voltage controlled oscillator (VCO). The in-phase and the quadrature sinusoidal waveforms are generated by means of computations (for example through a Cordic algorithm) or look-up tables. The integrate & dump blocks 34, 35, 36 are resettable accumulators with a sample and hold. The data rate of the output of each correlator is equal to the frequency of the wobble.

Assuming that the delay of the PLL 2 can be neglected, i.e. the recovered frequency generated at the output of the cos is exactly in phase with the fundamental frequency of the input wobble signal, the behaviour of the down-converter 3 can be easily analysed. As an example, it is also assumed that the wobble period is normalized to 1, that the wobble amplitude is equal to 1, and that the amplitude of the sinusoidal waveforms (fundamental frequency and 1.5 frequency) generated in the demodulator 1 is equal to 2 and the amplitude of the second harmonic generated in the demodulator 1 is equal to 0.5, i.e. 4 times smaller than the amplitude of the fundamental frequency. All following numbers are based on this exemplary values. Using other values, different numbers are obtained. As a consequence, ideally the output of the correlators is equal to 1 when the same frequency is received with the same phase, −1 when the same frequency is received with a 180° phase shift, and 0 otherwise. Of course, under real conditions interim values are obtained.

When an MSK mark arrives, the signals I1 and I1*h* are given by the streams in the following Table 1:

| | MW | MW | MW | MSK | MSK | MSK | MW | MW | MW |
|---|---|---|---|---|---|---|---|---|---|
| I1 | 1 | 1 | 1 | 0 | −1 | 0 | 1 | 1 | 1 |
| I1h | 0 | 0 | 0 | 1 | 0 | −1 | 0 | 0 | 0 |

When an HMW arrives, I2 is equal to 1/16, otherwise it is always 0.

Figure 5:
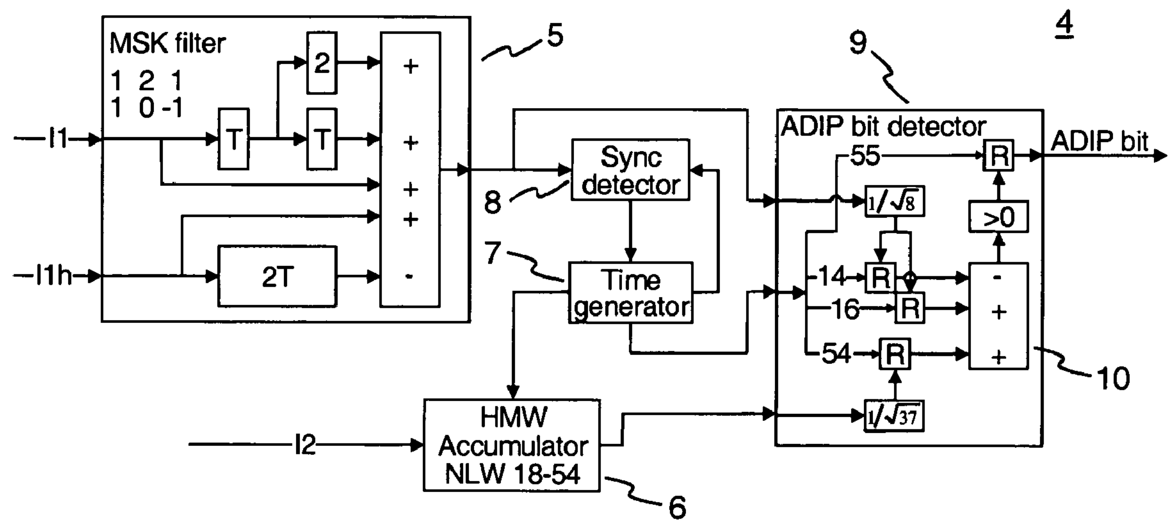
FIG. 5 shows a scheme of the base band demodulator.

FIG. 5 shows a scheme of the base band demodulator 4, which processes the base band signal to detect the proper data synchronization and to recognize the bit values of the ADIP words. The base band demodulator 4 includes the following functional blocks:

1. MSK filter 5
2. HMW accumulator 6
3. Time generator 7
4. Sync detector 8
5. ADIP bit detector 9

The MSK filter 5 applies a proper filtering to the signals I1 and I1*h* for improving the detection of the MSK phase for the wobble periods 0–55 within the ADIP unit, considering the degradation due to the input noise.

The HMW accumulator 6 improves the noise rejection of HMW demodulation by integrating the base band signal over several wobble periods, precisely the wobble periods 18–54. For this purpose it needs a proper timing.

The time generator 7 includes two counters, namely a wobble counter [0–55] locked to the ADIP unit and an ADIP unit counter [0–82] locked to the ADIP word. Moreover, the time generator 7 provides all timing signals which are necessary for other parts. These signals are proper Boolean combinations of the abovementioned counters.

The Sync detector 8 performs the synchronization process in order to lock the time generator 7 to the ADIP unit and the ADIP word.

The ADIP bit detector 9 samples the output of the MSK filter 5 and the HMW accumulator 6 to obtain the amplitude of the MSK mark and the amplitude of the harmonic.

For the proper detection of an MSK mark a proper filter 5 improves the performance significantly. Without this filter 5, as a trivial solution, the ADIP unit sync detector 8 would recognize the MSK mark by analysing the negative peaks of the signal I1. In practice, considering the limitations of the PLL 2 and the noise at the input, this solution is improved by using also the signal I1$h$, because the energy of the useful signal is increased (doubled) in comparison with the above mentioned trivial solution.

Limiting the filter length to three wobble periods, a general two-dimensional filter has the following form:

$$F = \begin{matrix} f11 & f12 & f13 \\ f1h1 & f1h2 & f1h3 \end{matrix}$$

The problem of the optimum choice of filter coefficients in order to obtain the maximum signal to noise ratio can be solved adopting ML (Maximum-likelihood) detection.

Considering the above streams shown in Table 1, the filter 5 has six possible values of input signals I1 and I1$h$. They are:

$$W = \begin{matrix} 1 & 1 & 1 \\ 0 & 0 & 0 \end{matrix} \quad \text{when the input has only monotone wobbles}$$

$$M0 = \begin{matrix} 0 & -1 & 0 \\ 1 & 0 & -1 \end{matrix} \quad \text{when the input corresponds exactly to the } MSK \text{ mark}$$

$$M1P = \begin{matrix} 1 & 0 & -1 \\ 0 & 1 & 0 \end{matrix} \quad \text{one wobble period before the } MSK \text{ mark}$$

$$M1M = \begin{matrix} -1 & 0 & 1 \\ 0 & -1 & 0 \end{matrix} \quad \text{one wobble period after the } MSK \text{ mark}$$

$$M2P = \begin{matrix} 1 & 1 & 0 \\ 0 & 0 & 1 \end{matrix} \quad \text{two wobble periods before the } MSK \text{ mark}$$

$$M2M = \begin{matrix} 0 & 1 & 1 \\ -1 & 0 & 0 \end{matrix} \quad \text{two wobble periods after the } MSK \text{ mark}$$

Due to noise the received wobble signal R can be described as R=S+N, where $$R \equiv \begin{matrix} r11 & r12 & r13 \\ r1h1 & r1h2 & r1h3 \end{matrix}$$

$$N \equiv \begin{matrix} n11 & n12 & n13 \\ n1h1 & n1h2 & n1h3 \end{matrix}$$

$$S \in \{W, M0, M1P, M1M, M2P, M2M\}$$

Neglecting M1P, M1M, M2P and M2M, the filter 5 should distinguish as much as possible W from M0. Therefore, the maximum likelihood MSK Mark detector should decide W or M0 by measuring the Euclidean distance of the received signal R from W and from M0. The decision is based on the minimum distance. The decision is equivalent to the measurement of the correlation with the difference value M0−W, so the best filter MF should match to the difference of the two values:

$$MF = (W - M0)^{tr} = \begin{pmatrix} 1 & 2 & 1 \\ -1 & 0 & 1 \end{pmatrix}^{tr} = \begin{matrix} 1 & 2 & 1 \\ 1 & 0 & -1' \end{matrix}$$

where tr stands for "time reversed". Considering the input stream of Table 1, this matched filter gives the following results as summarized in Table 2:

| | MW | MW | MW | MSK | MSK | MSK | MW | MW | MW |
|---|---|---|---|---|---|---|---|---|---|
| MF out | 4 | 4 | 4 | 4 | 0 | −4 | 0 | 4 | 4 |

The peak at −4 corresponds to the end of the MSK mark. It is apparent that the location of the MSK mark can be detected by searching the peak at −4.

Figure 1:
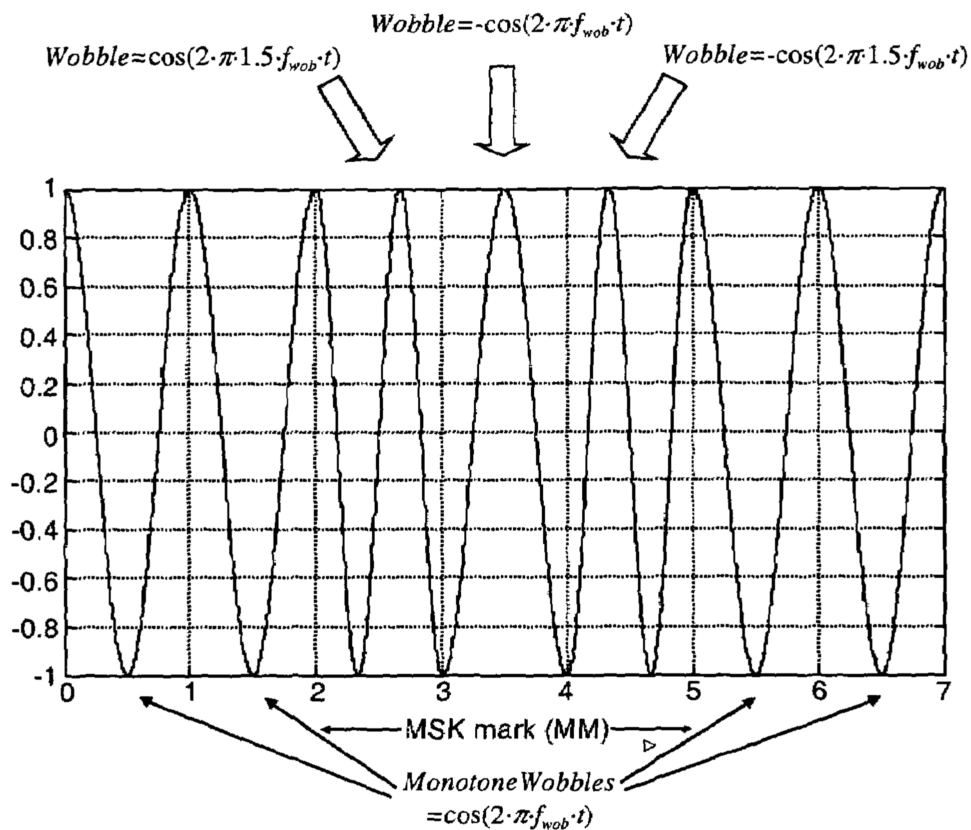
FIG. 1 shows an MSK mark in a wobble signal.
Figure 2:
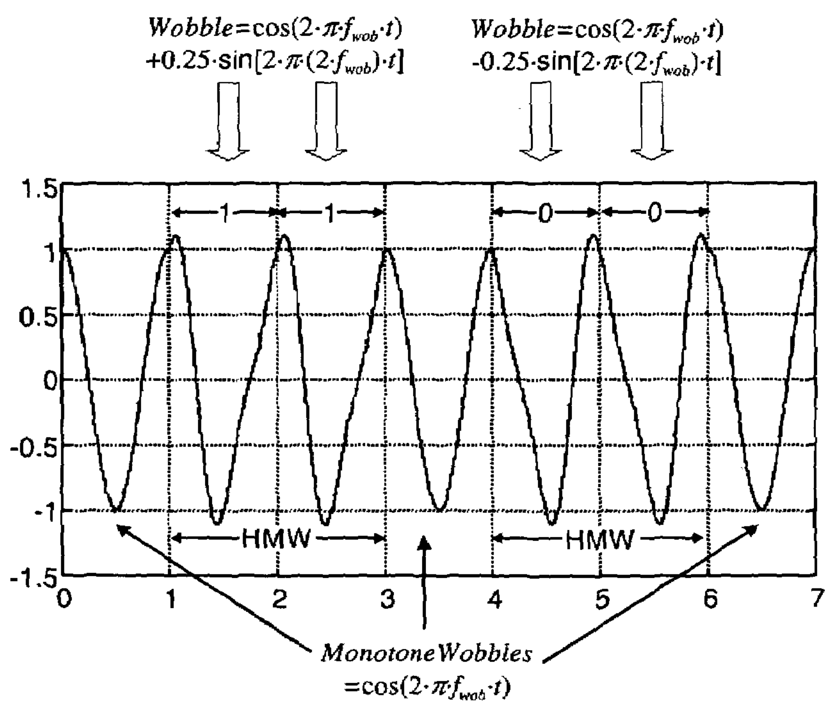
FIG. 2 shows HMW sawtooth wobbles in a wobble signal.
Figure 3:
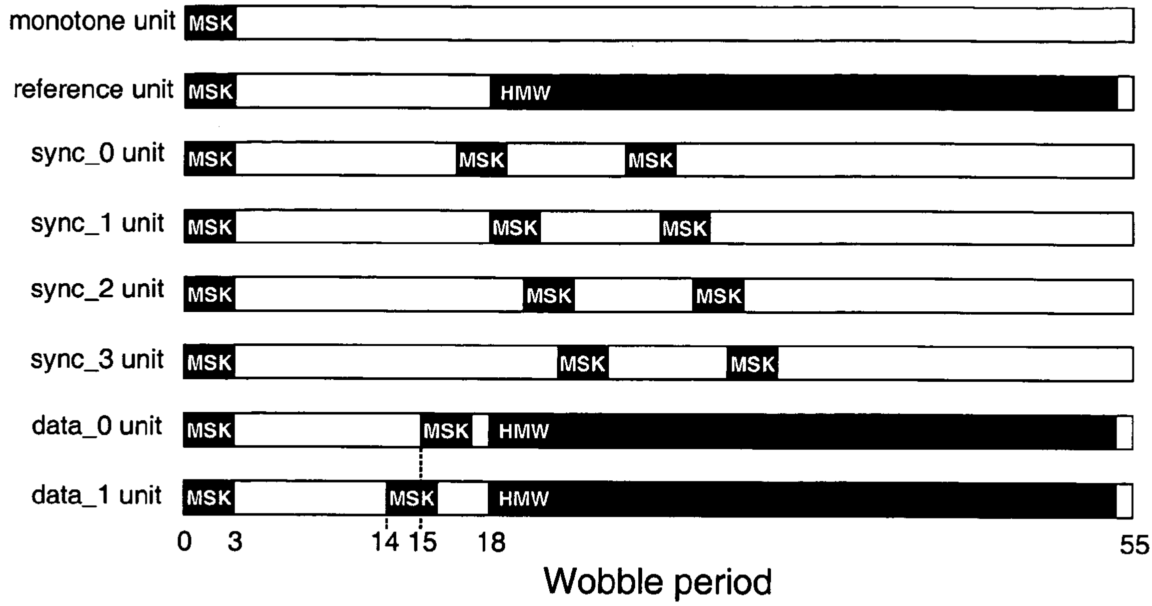
FIG. 3 depicts the simultaneous use of MSK marks and HMW sawtooth wobbles in the different ADIP units.

The output of the above filter 5 minimizes the probability of detecting W instead of M0 and vice versa. At the output of the filter 5 the signal looks like the MSK mark in FIG. 3. Where there is a MSK mark the signal is 0−4 0, with a delay of a wobble period, otherwise it is equal to 4.

The Sync detector 8 receives the output of the MSK filter 5 and manages two counters of the time generator 7 by preloading them in the proper way.

Several solutions of different complexity can be envisaged for the Sync detector 8. Fundamentally it is a state machine combined with an MSK mark detector. The MSK mark detector is a threshold detector, which detects an MSK mark when the signal is under the threshold −2. The inputs of the state machine are the addresses of the time generator counters and the detected MSK mark. The main states of the state machine are:

Reset: when an MSK mark is found it preloads 2 into the wobble counter and jumps to the ADIP unit lock state ADIP unit lock: when the next MSK comes, it analyses the wobble counter address If the address is 12 or 14 or 2 it simply confirms the state If the address is 16 or 18 or 20 or 22 it properly preloads the ADIP unit counter Otherwise it preloads 2 into the wobble counter ADIP word lock: checks that MSK marks happen at the expected time.

More complex solutions are possible to avoid false MSK mark detection, but they require a higher implementation cost in terms of silicon area.

For the minimization of the error rate it is worth to use as much energy of the signal as possible for the detection of ADIP data bits. The detection can either use the location of the MSK mark or the phase of the second harmonic. The best detector uses both by properly mixing the sampled output of the MSK filter 5 at the wobbles number 14 and 16 and the sampled output of the HMW accumulator 6 at the location 54. The amplitude of the signals from the MSK filter 5 and the HMW accumulator 6 must be balanced, normalizing the effect of the MSK filter 5 and the HMW accumulator 6. For the MSK filter 5, the square sum of the coefficients gives a value of 8. For the HMW accumulator 6 the length of the integrator gives a value of 37. Therefore, the signals are divided by $\sqrt{8}$ and $\sqrt{37}$, respectively. Of course, other weighting factors are also possible. The energy of the full detector is distributed among the three paths according to the following weights: 32 for each MSK path and 37 for the HMW path. Finally, to minimize the error rate an adder 10 combines the three paths in an optimised way.

Figure 6:
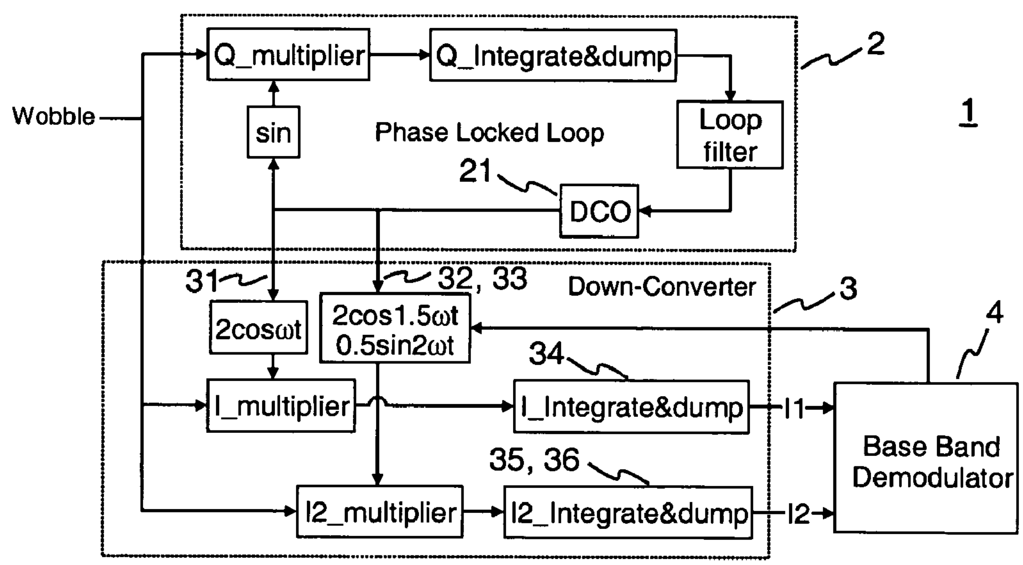
FIG. 6 shows a simplified coherent demodulator.

Considering that the second I-path (1.5) and the third path (2) are not used at the same time, in an advantageous embodiment a reduction of implementation cost (in terms of silicon area) is achieved with a coherent demodulator as shown in FIG. 6. In this embodiment, the sin/cos generator, the multiplier and the integrate & dump are the same for the two paths. The time generator generates a proper signal to switch between two different functions: a unique generator can be used for the two functions if the input is multiplied by 1.5 or 2 and it is translated by π and the output is multiplied by 2 or 0.5. Of course this solution implies that ADIP word synchronization is available. So at the start-up 2·cos 1.5 is selected for the MSK mark search and then, after ADIP word synchronization, the switch is used.

What is claimed is:

1. Method for the demodulation of the ADIP data of a wobble signal of an optical recording medium, whereby the wobble signal is modulated using two different methods, including the steps of recovering the carrier of the wobble signal, demodulating the wobble signal based on the recovered carrier, and using a two-dimensional MSK filter for detecting MSK marks in the wobble signal.

2. Method according to claim 1, wherein the step of demodulating the wobble signal based on the recovered carrier includes down-converting the modulated data to the base band and demodulating the down-converted data.

3. Method according to claim 1, wherein it is applied to a wobble signal which is modulated using the methods of minimum shift keying (MSK) and harmonic modulated wave (HMW).

4. Method according to claim 3, wherein a combination of MSK demodulation and HMW demodulation is used for demodulating the down-converted data, the combination being based on the locations of the MSK marks.

5. Method according to claim 3, wherein the step of down-converting the modulated data to the base band includes using three distinct correlation paths.

6. Method according to claim 5, wherein the three distinct correlation paths correlate to the in-phase carrier, the second harmonic of the carrier, and the 1.5 frequency of the carrier, respectively.

7. Method according to claim 5, wherein at least two of the correlation paths share components.

8. Device for demodulating the ADIP data of a wobble signal of an optical recording medium, whereby the wobble signal is modulated using two different methods, wherein it performs a method according to claim 1.

9. Apparatus for reading from and/or writing to recording media, wherein it uses a method according to claim 1.

* * * * *